April 16, 1957     M. MARTELLOTTI     2,788,718
CONTOURING MACHINE

Filed Aug. 30, 1954     9 Sheets-Sheet 1

INVENTOR.
Mario Martellotti

INVENTOR.
Mario Martellotti
ATTORNEYS

April 16, 1957   M. MARTELLOTTI   2,788,718
CONTOURING MACHINE
Filed Aug. 30, 1954   9 Sheets-Sheet 3

INVENTOR.
Mario Martellotti
BY
N. K. Parsons & L. W. Wright.
ATTORNEYS

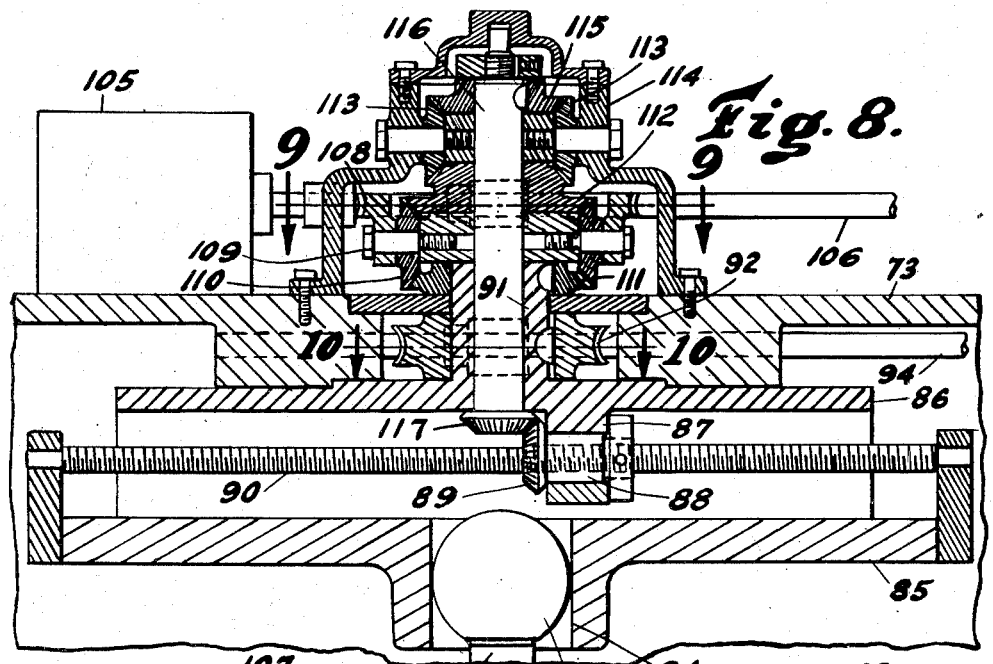

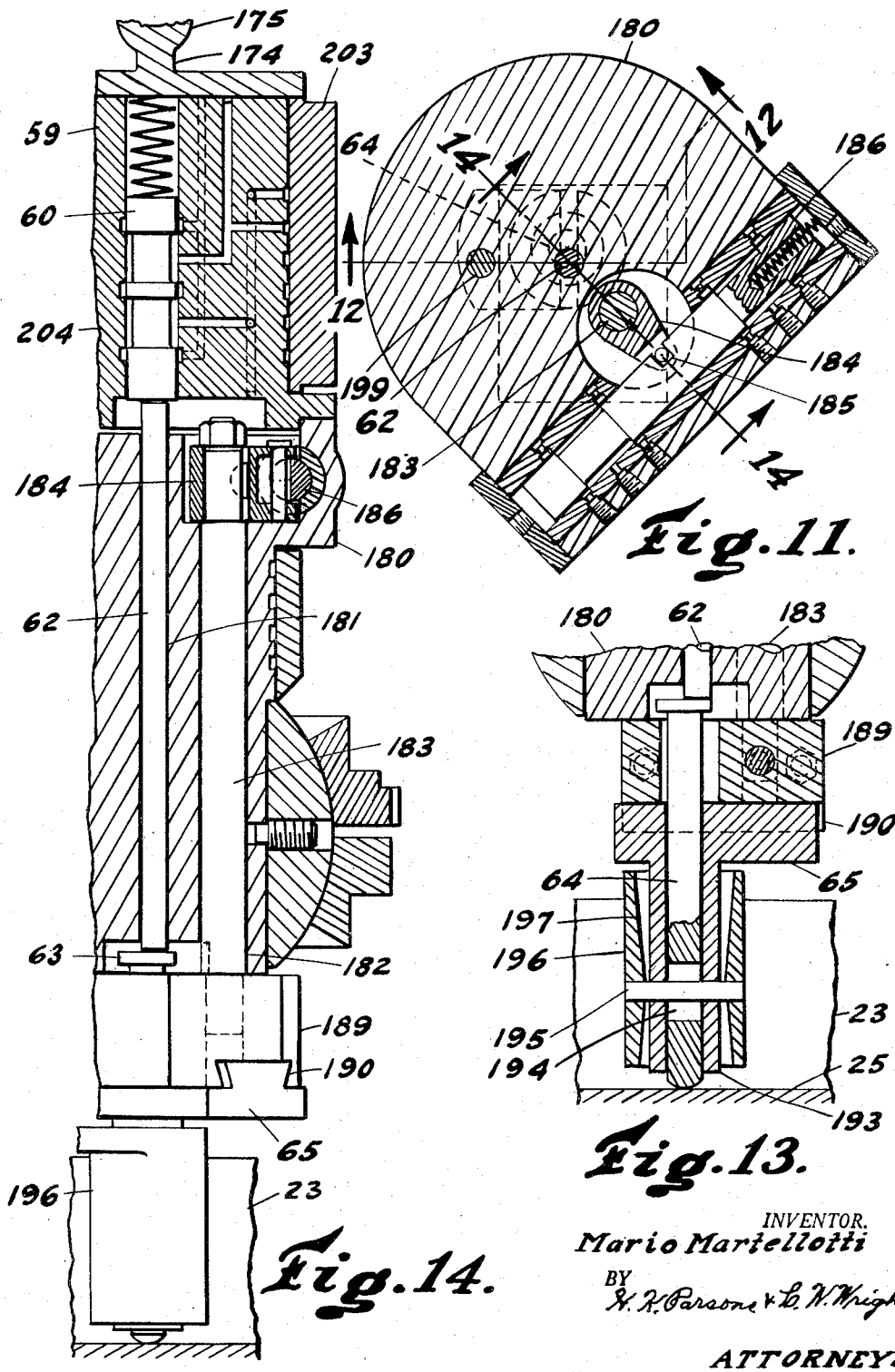

April 16, 1957     M. MARTELLOTTI     2,788,718
CONTOURING MACHINE

Filed Aug. 30, 1954     9 Sheets-Sheet 7

INVENTOR.
Mario Martellotti
BY
H. H. Parsons & C. W. Wright
ATTORNEYS

INVENTOR.
Mario Martellotti

INVENTOR.
Mario Martellotti

United States Patent Office 2,788,718
Patented Apr. 16, 1957

2,788,718

CONTOURING MACHINE

Mario Martellotti, Cincinnati, Ohio, assignor to The Cincinnati Milling Machine Co., Cincinnati, Ohio, a corporation of Ohio Application August 30, 1954, Serial No. 452,874

16 Claims. (Cl. 90—13.5)

This invention relates to improvements in contouring machines and has particular reference to improved means for determining the variable positionings of the cutter and cutter control mechanism of such machines.

One of the principal objects of the present invention is the provision of an improved form of contouring machine which shall embody simplified control mechanism for effecting duplication of the contoured surfaces of a pattern or work form.

A further object of the present invention is the provision in connection with a contouring machine having means supporting the contour generating cutter for movements both in a circumambulatory or 360 degree contouring path as respects a selected plane, together with means mounting the cutter for tilting adjustments of its axis with respect to said plane, of improved control mechanism for simultaneously determining the movements of the cutter and cutter support in the contouring path and for effecting desired axial tilting or angular adjustments of the cutter spindle axis with respect to said plane.

Additionally, the invention has for its object the provision in connection with a structure as above set forth of improved compactly arranged control mechanisms for control of bodily movement of the cutter in a path substantially perpendicular to said contouring plane.

The invention has for a further object the provision in a contouring machine of the type particularly adapted for duplication of three-dimensional work, of improved mechanism for effecting simultaneous contour path following, surface orientation and angular or tilting adjustment of the controlling tracer mechanism and the controlled cutter in a manner to insure accurate generation on a workpiece of a surface corresponding in its entirety with the surface of a three-dimensional guiding pattern.

A further object of the invention is the provision in connection with a structure for accomplishment of the results above set forth of means embodiable in and forming a portion of said adjustable tracer mechanism which will be effective during the simultaneous adjustments aforesaid automatically to control movements of the cutter in a direction perpendicular to the contour following path of the tracer and cutter to control the height relationship between the effective portion of a cutter and the workpiece on which a prescribed surface is being generated.

An additional object of the present invention is the provision in a contouring machine as aforesaid of an improved straight tracer structure embodying a single pattern contactor for simultaneously controlling both the contouring outline in a plane to be followed by the cutter and controlling also the angular adjustment of the cutter axis with respect to said plane.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 8 is a vertical section of one of the tilt control mechanisms as utilized in connection with the spindle and the tracer units.

Figure 9 is a fragmentary section on the line 9—9 of Figure 8.

Figure 10 is a fragmentary section on the line 10—10 of Figure 8.

Figure 11 is a horizontal section on the line 11—11 of Figure 4.

Figure 13 is a fragmentary section at right angles to Figure 12 and on the line 13—13 of Figure 12.

Figure 14 is a fragmentary vertical section as on the line 14—14 of Figure 11.

Figure 15 is a fragmentary section illustrating the work contactor of Figure 12 in a tilted position, and Figures 16 and 17 jointly provide a diagrammatic view of the basic hydro-mechanical features of the illustrated embodiment of the present invention.

Figure 12:
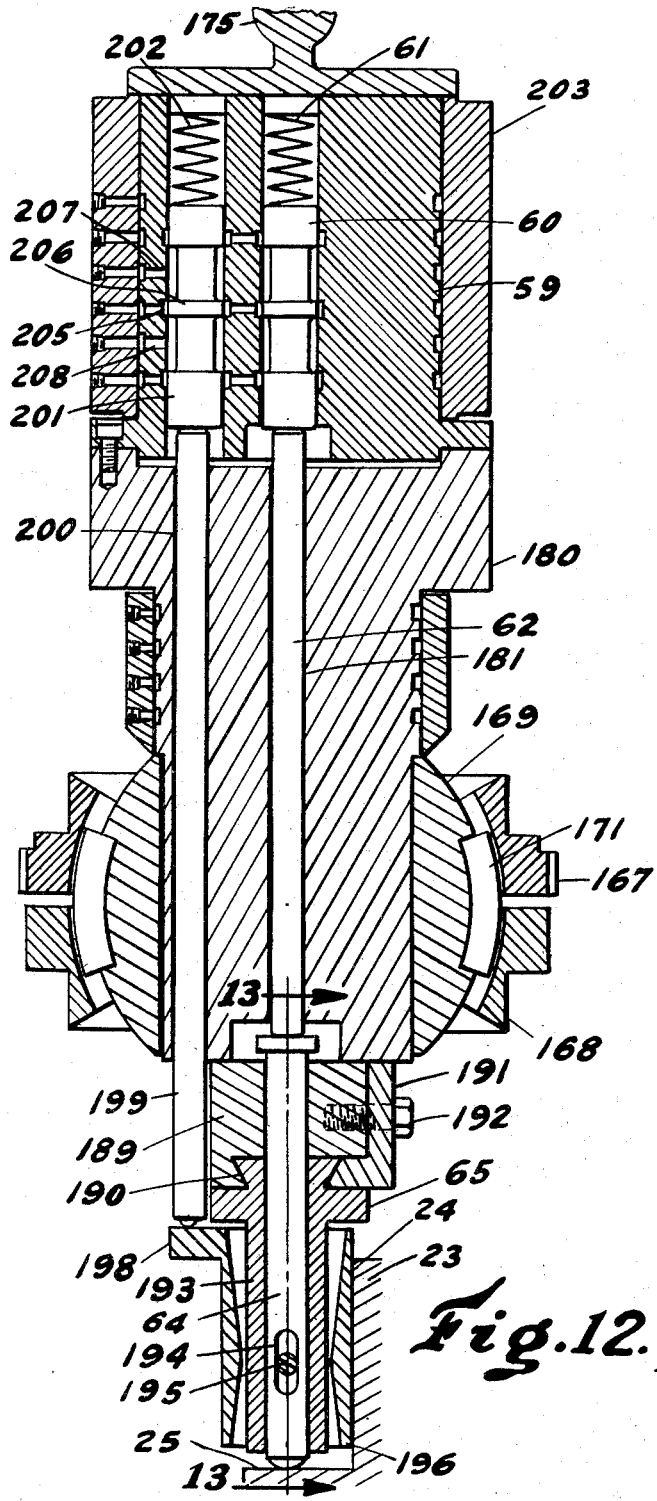
Figure 12 is a vertical section on line 12—12 of Figure 11.

In the drawings the numeral 20 designates the long bed portion of a contouring machine provided at one side with the table 21 adapted to support a workpiece and at the opposite side with a second co-extensive table portion 22 adapted to support the pattern 23 (Fig. 14) which may be in the form of a template or series of templates, or, as indicated for example in Figures 12 and 15, as a solid block or replica to be generated on the workpiece.

As illustrated, the pattern 23 has a peripheral face 24 which is indicated in Figure 12 as vertical, and in Figure 15 as tilted or disposed at an angle with respect to the body of the work and the base surface 25.

Figure 2:
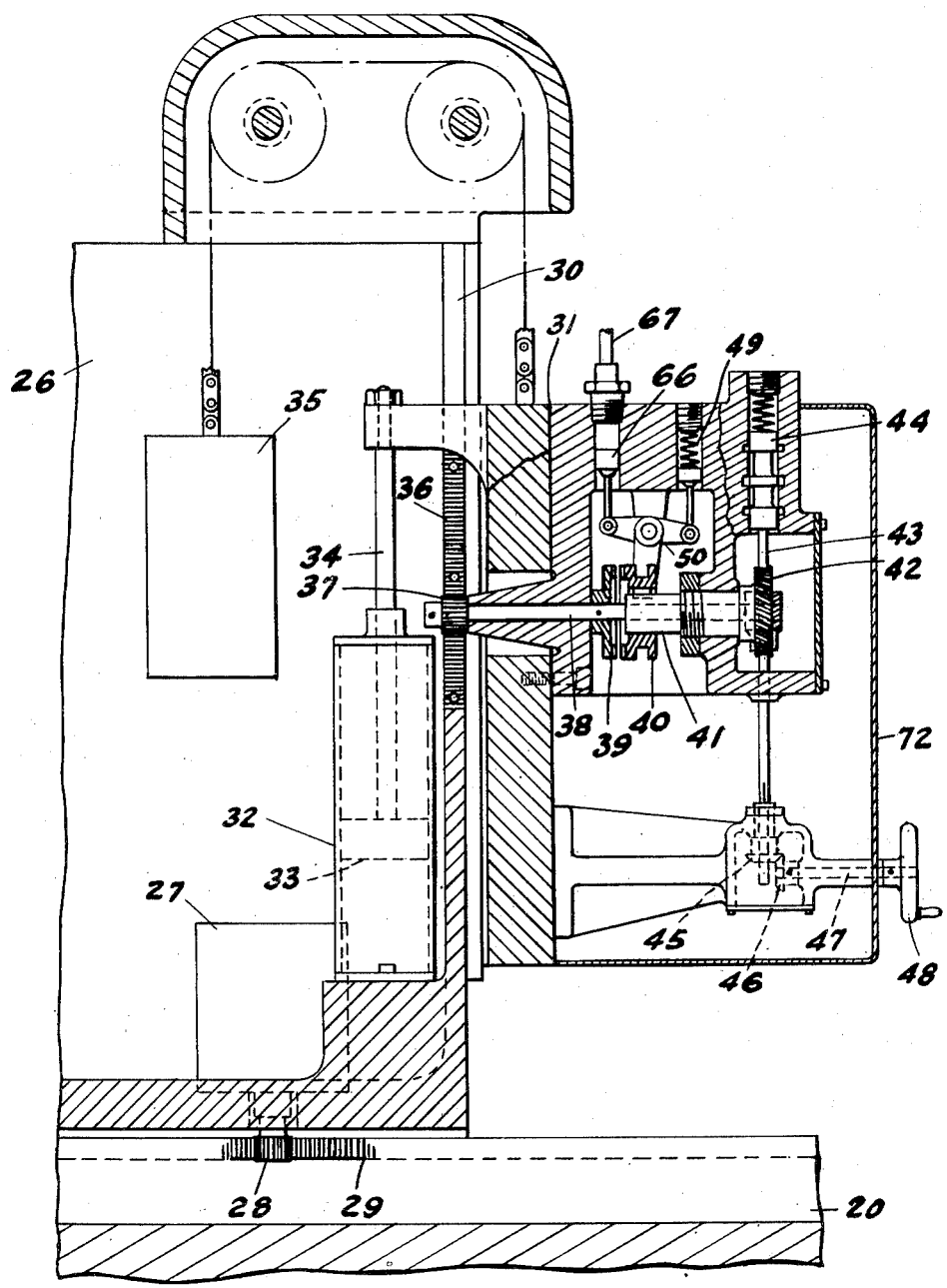
Figure 2 is a vertical section on the line 2—2 of Figure 1, particularly illustrating a portion of the depth control mechanism.
Figure 16:
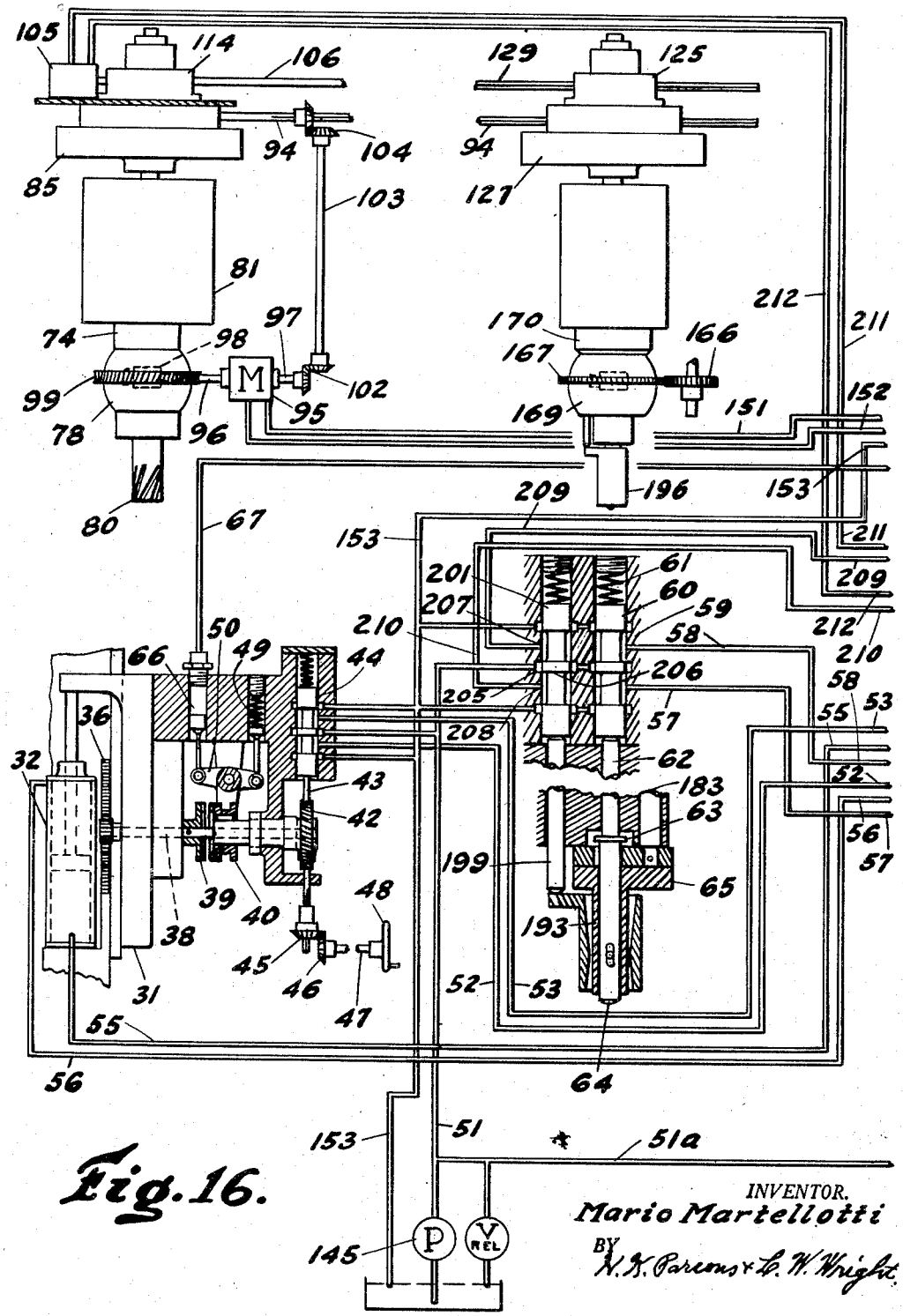
Figure 17:
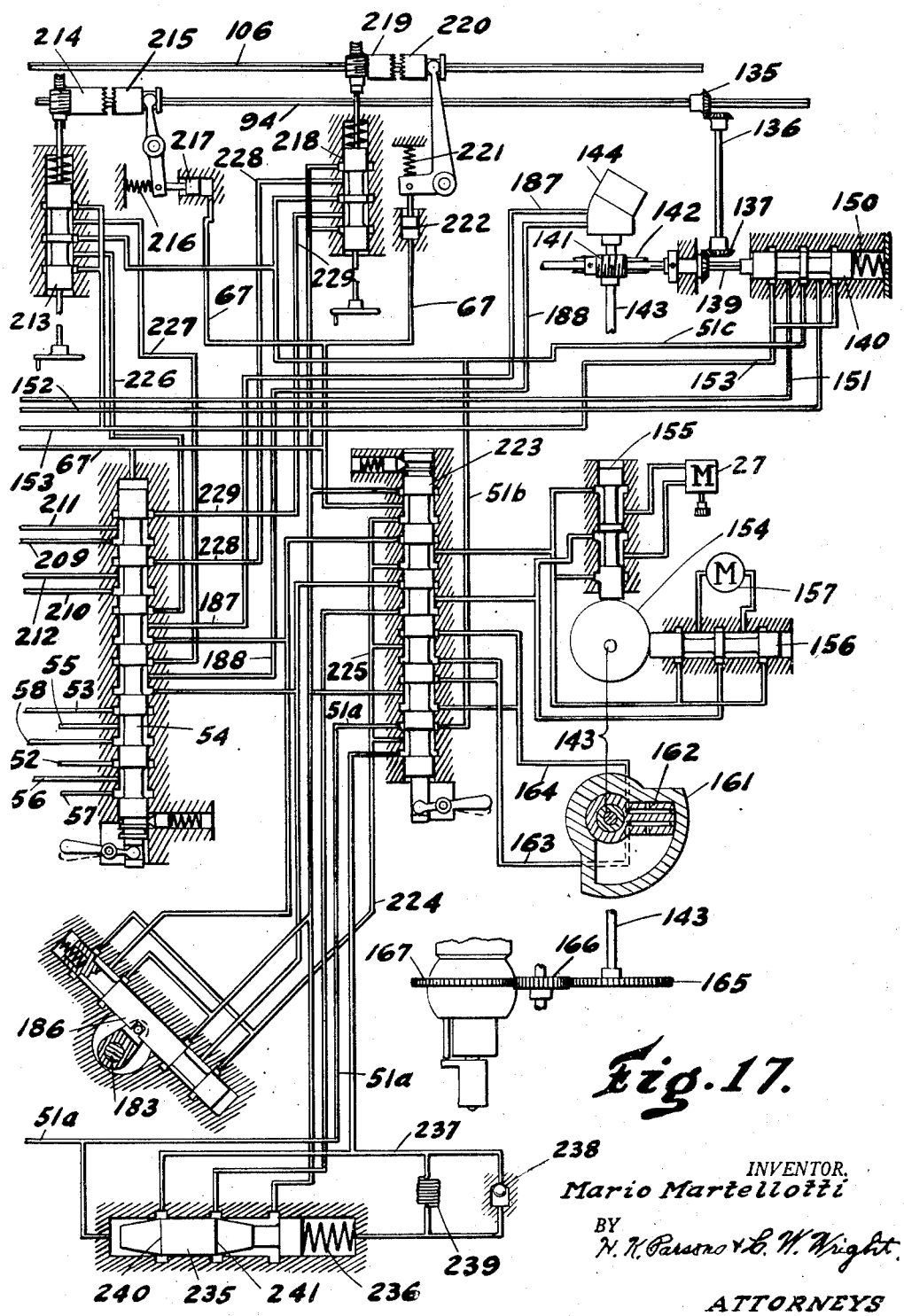

Longitudinally movable on ways of the bed 20 is the column 26 carrying a motor 27 (Fig. 2) driving pinion 28 in mesh with rack 29 on the bed for effecting longitudinal movement of the column with respect to the bed. Formed on the column are the ways 30 interengaged with ways on the vertical slide 31. Mounted in the column is the cylinder 32 containing piston 33 having a rod 34 connected to the slide 31 for effecting vertical adjustment of the slide. Counterweight 35 facilitates this adjustment. Carried by the column 26 is a rack 36 meshing with pinion 37 on shaft 38 carrying clutch 39 engageable with clutch 40 on sleeve 41. The shaft and sleeve are journaled for rotation in the member 31. Sleeve 41 carries a worm gear 42 meshing with a worm on shaft 43 secured at one end to valve 44 and carrying at its lower end gear 45 splined on the shaft 43 and meshing with gear 46 on the shaft 47 carrying hand wheel 48. Spring 49 reacts on clutch shifter 50 to hold the clutch members 39 and 40 in engagement. When so engaged the parts act as a feedback drive for the servo-valve 44 repositioning the valve for any handwheel effected adjustment. As shown in Figures 16 and 17, the servo-valve 44 controls the connection of the operating pressure conduit system 51 to one or the other of the conduits 52, 53 extending to the hand-automatic selector valve 54. When the valve is in its raised or manual control position, conduits 52 and 53 are connected through the valve to the conduits 55 and 56 extending to the vertical movement control cylinder 32. When the valve is in automatic position, as shown in Figure 17, the cylinder or hydraulic motor conduits 55 and 56 are connected with the conduits 58 and 57 leading to the bushing 59 of the automatic depth control valve 60. This valve is urged into downward position by the spring 61, resting against push rod 62 which, in turn, engages the flanged head 63 of the vertical slidable depth control tracer plunger 64, slidably supported by the tracer block 65. It will be evident that when the valve 54 is in the automatic control position that vertical movements of the pattern contact 64 will determine the positionings of valve 60 for automatic vertical adjustment of the slide 31.

It will be noted that piston 66 (Figs. 2 and 16) is connected to the shifter and subject to action of pressure in conduit 67 when the control valving is in present position, automatically to shift the clutch 40 into released position, disconnecting the manual vertical control.

Figure 1:
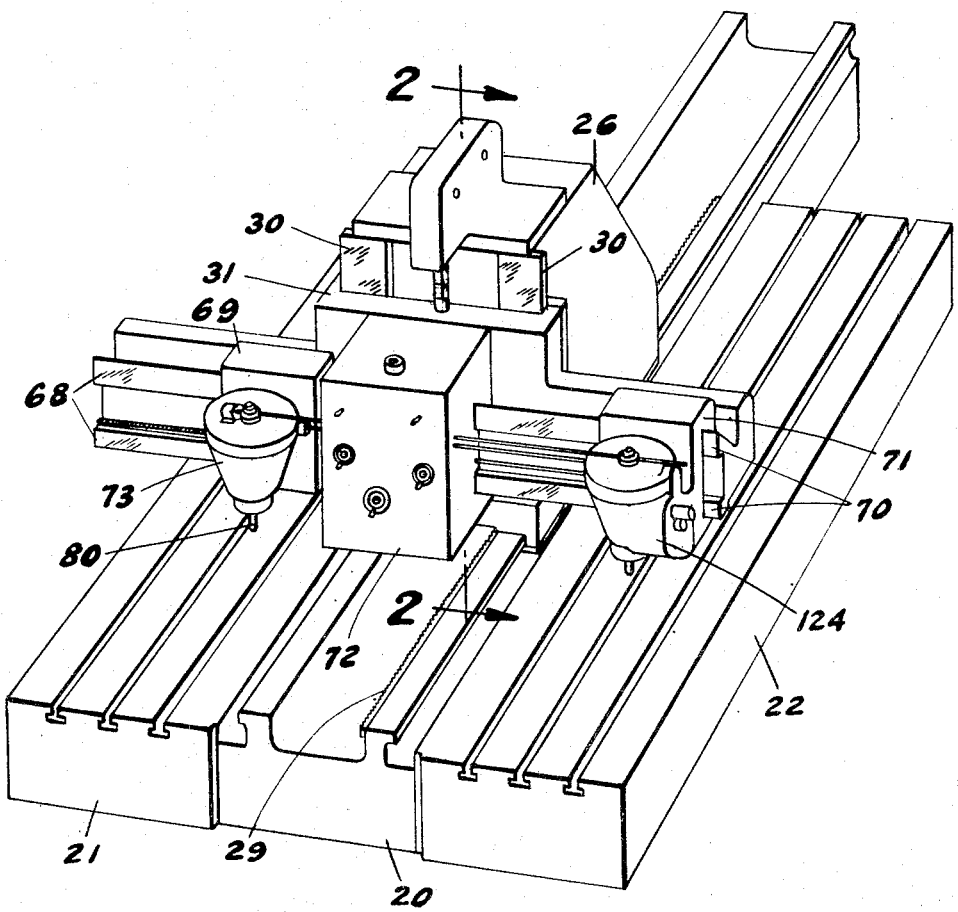
Figure 1 is a perspective view of a contouring machine illustrating one embodiment of the present invention.

The vertical slide 31 is provided with the transverse ways 68 (Fig. 1) mounting the cutter cross slide 69 and similar ways 70 mounting the tracer cross slide 71 intermediate which is located the control box or housing 72.

Figure 3:
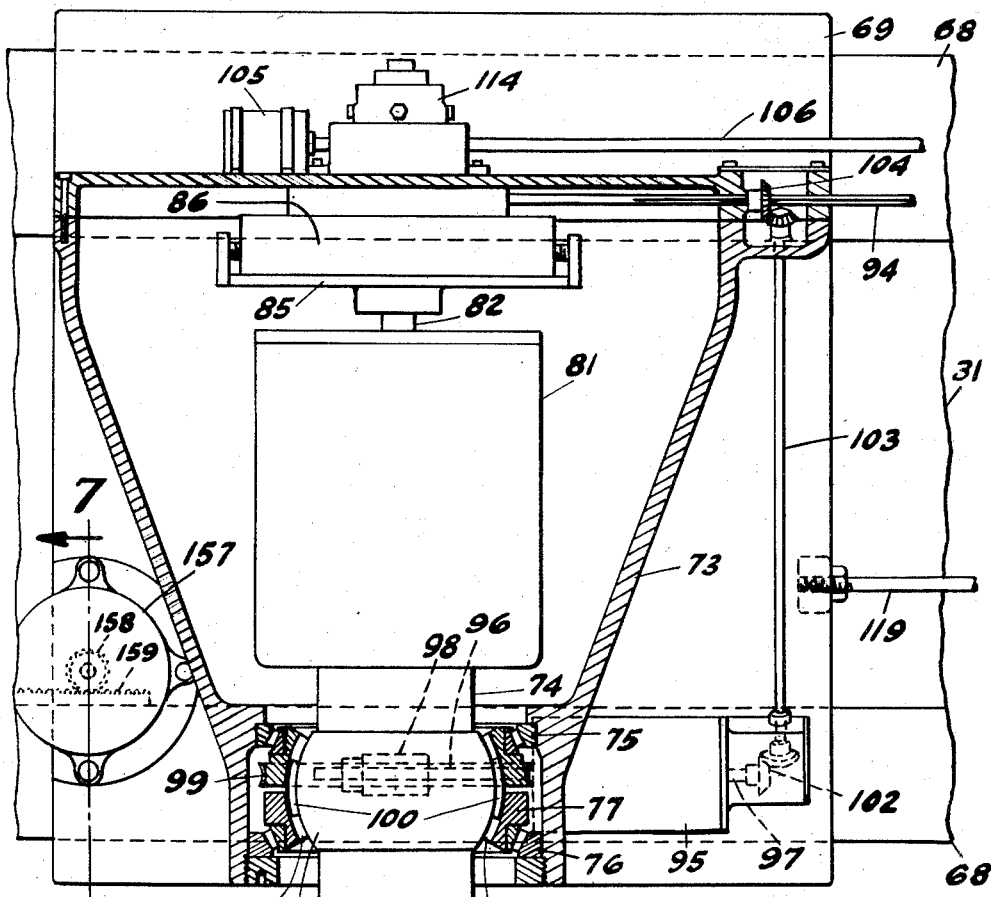
Figure 3 is a vertical section of the cutter support housing showing the manner of mounting of the spindle carrier unit for the cutter.

Supported by the slide 69 is the housing 73 for the swiveled spindle carrier 74 (Fig. 3). At its lower portion the housing 73 is provided with the upper anti-friction race 75 and lower anti-friction race 76 rotatably mounting the socket 77 for the ball 78 at the lower end of the spindle carrier 74. Depending from this ball is the cutter spindle 79 mounting the cylindrical cutter 80 while extending upward within the housing 73 is the casing 81 for the spindle drive motor from which projects stud 82 carrying the ball 83 (Fig. 8). The ball 83 is engaged in the bearing cylinder or bore of flange 84 formed on slide 85. This slide 85 depends from and, as viewed in Figures 3 and 8, is guided for transverse movement relative to the rotatable table 86. Rotatably supported in the lug 87 of table 86 is the sleeve nut 88 having a beveled gear portion 89. Extending through the sleeve nut 88 is the adjusting screw 90 having its ends secured to brackets on the slide 85. The rotary table 86 has an axial hub or sleeve portion 91 rotatably supported by the housing 73. Keyed on this hub 91 is a worm gear 92 meshing with worm 93 (Fig. 10) on shaft 94.

A rotary hydraulic motor 95 (Figs. 3 and 16) carried by the slide 69 has a double ended shaft 96—97. The portion 96 of the shaft is provided with a worm at 98 in driving engagement with the worm gear portion 99 of the rotatable socket 77. Arcuate keys 100 (Fig. 3) carried by the ball 78, engaged in ways 101 of the socket, support the spindle carrier 74 in the socket 77 for oscillating movement in a vertical plane while preventing relative rotation between the spindle carrier and socket. The opposite end of the motor is coupled by gearing 102 (Fig. 16), shaft 103, and gearing 104 to the shaft 94 for effecting rotation of the table 86 in synchronism with the rotation of the spindle carrier.

For effecting rotation of screw 90 (Fig. 8), and thus transverse adjustment of slide 85 with respect to the rotary table in any adjusted position of rotation of the table, use is made of the hydraulically actuable motor 105 (Figs. 8 and 16) mounted on the housing 73 and actuating drive shaft 106 having worm 107 (Fig. 9) meshing with gear 108 of the differential hub 109 carrying the bevel pinions 110 meshing at one side with the gear 111 keyed to hub 91 and on the opposite side with the idler table bevel gear 112 having an upper bevel portion meshing with the pinions 113 carried by the stationary cap 114 which is secured to the housing 73. Pinions 113 mesh with the bevel gear 115 secured to the upper end of the shaft 116 rotatably supported within the hub 91 and having at its lower end the drive gear 117 meshing with the bevel gear 89. By the gearing connections as described and shown, rotary movement imparted to shaft 106 will be transmitted through shaft 116 to turn the sleeve nut 88 in one direction or the other for back and forth adjustment of the swivel controlling slide 85. It will be evident, however, that due to the double differential connecting gear 111 on hub 91 with gear 115 on shaft 116 that when shaft 106 and gear 108 are stationary there will be in effect a feedback drive causing a rotation of shaft 116 in synchronism with any rotative adjustment of the rotary table 86 so that any transversely adjusted position of the cross slide 85 will remain constant and be unaffected by rotational adjustment of the table 86.

Figure 6:
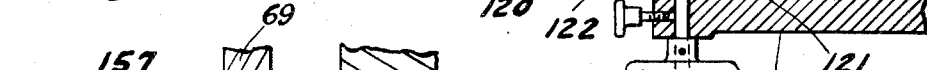
Figure 6 is a fragmentary transverse section on the line 6—6 of Figure 4.
Figure 4:
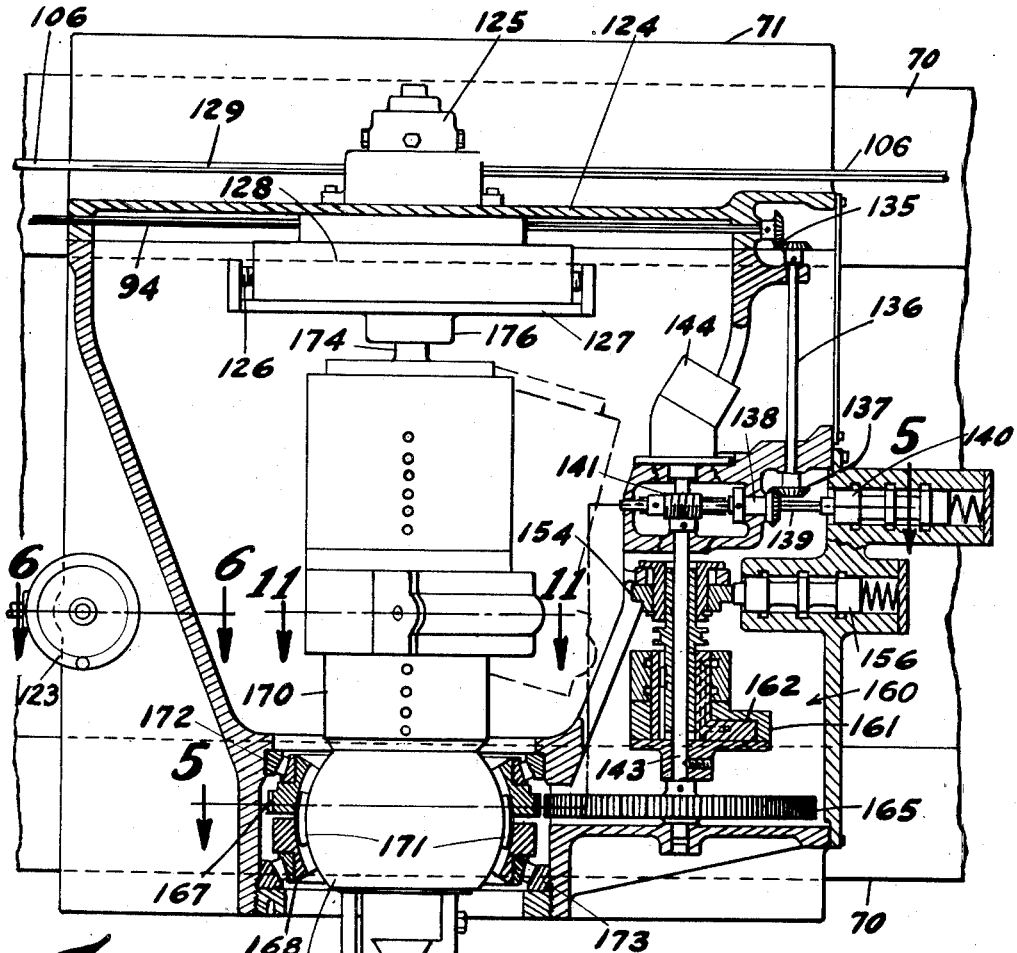
Figure 4 is a view in elevation of the tracer portion of the present invention, the support and portion of the driving mechanism therefor being shown in section.
Figure 5:
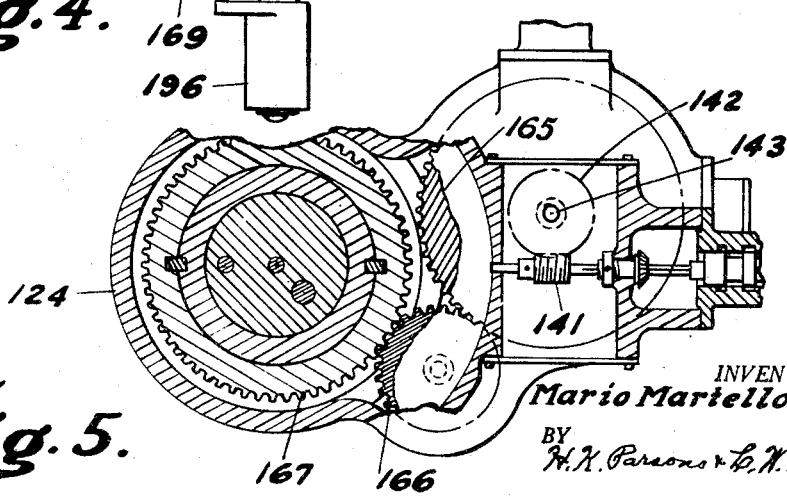
Figure 5 is a transverse sectional view on the line 5—5 of Figure 4.

The slide 69 is connected to the slide 71 for joint transverse movement of the parts by the tie rod 119 (Fig. 3) having threaded portion 120 (Figure 6) engaged in sleeve nut 121 journaled in the slide 71 and actuable by gearing 122 and hand wheel 123 for effecting relative positioning of the two slides. Mounted on the slide 71 is the housing 124 (Fig. 4) corresponding in general structure with the housing 73 and bearing the cap member 125 having a gear box arrangement forming a duplication of that illustrated and described in connection with Figure 8 reacting on the screw 126 for adjusting the cross slide 127 with respect to the rotary table 128 supported by the housing 124 in the same manner that the rotary table 86 is supported by the housing 73. The shaft 106 has a splined portion at 129 permitting relative adjustment of the two slide units without effecting the drive from the shaft 106 to the gearing contained in the cap member 125. Journaled in the housing 124 is the feedback shaft 94, one end of which extends to the right as will be evident by joint reference to Figures 3 and 4 of the drawings and, as previously described, is connected by bevel gearing 104, shaft 103 and gearing 102 to shaft 97 of motor 95. At its right hand end the feedback shaft 94 is coupled by the bevel gearing 135, shaft 136 and gearing 137 to sleeve 138 rotatably supported by the housing 124. Splined within the sleeve 138 for axial shifting movement is shaft 139 coupled at one end with the valve spool 140 and having secured on its other end the worm 141 meshing with a gear 142 (Fig. 5) on shaft 143 of the 360 degree tracer control motor 144 (Fig. 4), whose operation is controlled by that portion of the present improved tracer mechanism particularly illustrated in Figures 11, 13 and 14 of the drawings as will be hereinafter described.

When the motor 144 is energized to rotate gear 142 in one direction or another, worm 141 will operate in effect as a rack effecting a longitudinal or axial shifting of shaft 139 and valve spool 140. As particularly illustrated in Figures 16 and 17, the pressure port of the valve is supplied with fluid actuating medium by the pump 145 by way of conduits 51a, 51b, 51c. Movement of the valve to the right, as viewed in Figure 17 against the force of spring 150 will couple conduit 51c with conduit 151 extending to one side of motor 95 and will couple the conduit 152 to the reservoir conduit 153 while opposite directional movement of the valve spool will reverse the pressure and exhaust connections as respects the motor lines 151 and 152. The tracer motor 144 thus operates, when activated mechanically, to shift the valve 140 for control of the operation of the motor 95 for orientation of the spindle carrier unit while the feedback connections through 103, 94, 136 serve to rotate the worm 141 with respect to the worm gear 142, moving the spool 140 to a neutral position. In this manner complete servo-controlled synchronism of operation of the motors 95 and 144 is effected.

Figure 7:
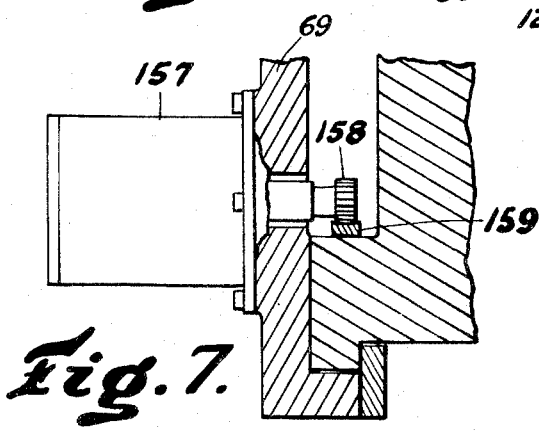
Figure 7 is a fragmentary vertical section on the line 7—7 of Figure 3.

Carried and driven by the shaft 143 of motor 144 is the 360 degree control cam or eccentric 154 reacting on valve 155 which controls motor 27 for effecting movement of the column 26 longitudinally of the bed 20. Additionally controlled by this cam is the valve 156 determining operation of the traverse motor 157 mounted on the cross slide 69 driving pinion 158 (Fig. 7) engaging rack 159 on one of the ways 68 for effecting the transverse movement of the slide. By suitable control of the relative rates of operation of the motors 27 and 157, circumambulatory relative movement between cutter and workpiece on the table 21 may be effected in accordance with the known principles of 360 degree tracer control.

Circumscribing the shaft 143 is a control mechanism 160 (Fig. 4) for the positioning of the cam 154. This mechanism includes the vane type motor comprising casing 161 (see also Fig. 17) with oscillating vane 162 hydraulically controlled by pressure changes in the vane motor lines 163 and 164. Operation of this motor, controlled by valve 223 as hereinafter described, effects a 90 degree phase shift of the 360 degree control eccentric 154 depending on whether the machine adjustment is for approach to the work or performance of a contouring operation around the work under pattern control.

Secured to the lower end of the shaft 143 is a drive gear 165 (Figs. 4 and 5) which through idler pinion 166 drives gear 167 on the rotatable socket 168 which supports ball 169 on tracer assembly 170. Keys 171 on the ball riding in vertical grooves in socket 168 secure the ball for rotary movement with the socket while permitting of its tilting or oscillatory movement. The socket itself is supported by upper and lower sets of anti-friction bearings 172 and 173 in the lower end of housing 124. At its upper end the tracer assembly unit 170 is provided with stud 174 having spherical ball 175 (Fig. 15) for interfitting engagement with the socketed collar 176 (Fig. 4) on the underside of the transverse slide 127, the manner of supporting the tracer unit 170 for tilting movement and for effecting its tilting movement being in all essential respects the same as previously described in detail in connection with the mounting and controlling of the spindle carrier unit 74.

From the foregoing it will be evident that the 360 degree tracing or pattern contour reproducing control motor 144, in itself of conventional construction, serves additionally to effect a power rotation of the tracer unit such as to maintain a continuously oriented relationship between the pattern contacting portion of the tracer and said pattern, and at the same time in the specific embodiment illustrated, controls the effective position of a valving for a second motor which serves by independent power to effect a corresponding rotary orientation of the spindle carrier unit with respect to the workpiece being operated upon. The connection and relationship of the parts are such that the spindle carrier unit and the tracer unit are rotated in synchronism but, as illustrated, feedback mechanism is employed from the independent spindle carrier orienting motor mechanism to the 360 tracer control mechanism for maintaining the synchronous adjustment of the parts. This arrangement is preferred in the case of heavier spindle and spindle carrier parts as enabling employment of a small or standard tracer motor although it will be apparent that future movement of light parts what has been characterized as a feedback transmission could be utilized for directly transmitting power from the 360 degree tracer motor to the spindle carrier unit for actuation of same. It will further be evident that due to the corresponding manner of mounting of the spindle carrier unit and the tracer unit, their joint orientation, and the simultaneous joint orientation of the tilt controlling slides 85 and 127 that simultaneous actuation of the slides 85 and 127 will effect equal and corresponding amounts of tilt of the tracer unit and the spindle carrier, its spindle and supported cutter, which in the forms shown will preferably be in a plane perpendicular to the tangent plane of contact of the cutter with the workpiece being channeled.

The physical details of the tracer unit structure 170 advantageously utilizable in connection with and forming a part of the present invention are particularly illustrated in Figures 12, 13, and 14 of the drawings. It will be understood that the combination tracer mechanism there shown is adapted to control both the 360 degree profiling or contouring movements of the cutter with respect to the workpiece and, in addition, the vertical positioning of the cutter during a machining operation, the orientation of the cutter and the tilting of the cutter continuously to conform in position to the surface of the pattern being followed. Attention is also invited to U. S. Patent No. 2,730,129 for Tracer Control Mechanism, granted January 10, 1956, to Albert H. Dall and Hans Fritschi, for a more complete discussion of the type of tracer mechanism about to be described.

As illustrated, the tracer structure comprises a substantially cylindrical body portion 180 having a portion fitting within and supported by the ball 169 which mounts the unit for tilting adjustment. Portion 180 has an axial bore at 181 slidably receiving push rod 62 whose lower end rests on the end flange 63 of the sliding depth control finger or plunger 64. This plunger, as shown in Figures 12, 14, and 16, controls the positioning of the depth control valve 60 within the bushing 59 secured on the upper end of the unit 180, the operation of this phase of the valve having been previously described. Formed in the member 180 in offset or eccentric relation with respect to the bore 181 is a second bore 182 (Fig. 14) rotatably mounting the rock shaft 183. Keyed on the upper end of this shaft is the rock arm 184 (see also Fig. 11) having a pin fitting in notch 185 of the spring biased valve 186 which controls the reversible coupling of the tracer motor conduits 187 and 188 to pressure exhaust and thus the direction of actuation of the tracer head motor 144.

Pinned to the lower end of the rock shaft 183 is the block 189 having ways 190 slidably supporting the tracer block 65. These ways provide for transverse adjustment of the tracer block 65 with respect to the axis of the tracer body 180 as is particularly indicated in Figure 13. Plate 191 (Fig. 12) clampable by bolt 192 serves to secure the block in desired offset position to impart the necessary amount of anticipatory positioning of the tracer. The tracer block has the depending stem or sleeve 193 through which the depth tracer 64 slides, the depth control plunger having an elongated slot 194 providing clearance about the pivot pin 195 carried by the sleeve 193. Mounted on this pivot pin is the contactor sleeve 196 having a double taper bore at 197, permitting of limited oscillatory movement of the sleeve 196 about the pin 195 as a center. This oscillatory movement permits the contactor sleeve automatically to adjust itself to a straight portion of the peripheral face 24 of the pattern 23 as indicated in Figure 12 of the drawings or to a tilted or angled portion of the face as indicated in Figure 15 of the drawings.

The tilting sleeve 196 is provided with a flange or lug at 198 against which rests the lower end of the cutter tilt control rod 199 as particularly indicated in Figures 12 and 15 of the drawings. This rod 199 is slidably mounted in the offset passage or bore 200 in the tracer body 180 and at its upper end engages the spool valve 201 urged downwardly by spring 202. A distributor head or sleeve 203 circumscribing the valve bushing portion 59 controls the supply and exhaust connections of the hydraulic control medium by way of the bushing to the valve 201. These hydraulic connections are particularly diagrammatically illustrated in Figure 16 in which it will be seen that the pressure conduit 51 is coupled with the intermediate valve groove 205 opposite the land 206 on the valve 201 so that movements from the intermediate neutral position of the valve shown in Figure 12 will couple pressure respectively to the portings 207 or 208, and by way of conduits 209 and 210 and valve 54, when it is in the automatic position shown in Figure 17, to the motor conduits 211 or 212. As is conventional in tracer control valves of the type here illustrated, when either of the motor conduits is connected to pressure the opposite motor conduit will be connected through the valve to the exhaust conduit system 153, so that the motor 105 will be properly actuated for effecting the desired transverse movement of the slides 85 and 127 and consequent equal angle of tilt of the tracer unit 170 and the spindle carrier unit 74.

It will be understood that the tilting of the spindle carrier resultant from a tilting of the pattern contactor sleeve 196 will continue until the outer surface of the sleeve 196 is in parallel relation with the axis of the tracer body 180. In the event that the nature of the tilt is such as to cause a movement of the lower end of the tracer body, and consequently the contactor sleeve toward or from the surface of the pattern as an entirety, this movement through the eccentric relationship of the sleeve 196 to the body 180 will cause an oscillation of the tracer block 65 (Fig. 13), rock shaft 183 (Fig. 11) and rock arm 184 to shift the valve 186 (Figs. 11 and 17), initiating operation of the tracer head motor 144 to an amount necessary to restore and maintain longitudinal and transversely movable slide elements in proper contour following position. At the same time should this tilting be in amount sufficient to vary the vertical relationship of the lower edge of the cutter with respect to the work there will be effected a concomitant displacement of the depth control plunger 64, creating the necessary vertical movement correction.

It will thus be seen that by this particular tracer structure there is a definite cooperative relationship and common functioning between the contour controlling, the angle controlling, and the depth controlling portions of the tracer in that they all jointly and simultaneously function and operate upon any change in contour and/or surface angle of the pattern properly to maintain the desired relationship between the effective tangent line on the cutter and the workpiece to generate on the workpiece a reproduction of the controlling surface of the pattern.

For effecting manual control of orientation of the rotary tables, there has been provided the hand operable servovalve 213 (Fig. 17) including the feedback sleeve 214 freely rotatable on the shaft 94 to which it may be coupled by the clutch 215 actuable into clutching position by the spring 216 and movable into disengaging position by piston 217 when pressure exists in conduit 67.

A similar servo-valve 218 (Fig. 17) includes a feedback sleeve 219 rotatably supported on shaft 106 to which it may be connected for feedback purposes by the sliding clutch 220. Spring 221 urges the clutch into operative position from which it may be shifted by action of piston 222 in existence with pressure in conduit 67. This servo is for use in hand control of the motor 105 which determines the angular positioning of the cutter support and tracer support.

In Figure 17, the selector valve 223 is shown in position to couple pressure from conduit 224 by way of conduit 225 and 67 so that the servo-feed back clutches 40, 215 and 220 are shifted to their ineffective or disengaged position, this being the automatic 360 degree tracing positioning of the valve 223. At the same time, the selector valve 54, if not previously so manually positioned, is automatically moved by pressure in the conduit 67 to the automatic control position as distinguished from its hand control position. In this latter position of the selector valve 54, the control conduits 226 and 227 from the servo-valve 213 are blocked off as respects the conduits 187–188 extending to the tracer head and orientation control motor 144, the conduits 187, 188 then being operatively associated with the 360 degree tracing or ambulatory movement control valve 186. At the same time, by the same positioning of the selector valve 54 the conduits 228 and 229 from the valve 218 are blocked off as respects the conduits 212 and 211 extending to the tilt control motor 105. In the setting of the selector valve 54, as shown in Figure 17, the motor conduits 212, 211 are coupled with the control conduits 210 and 209 extending to the automatic tilt control valve 201. When the valve 223 is moved upward to its approach control position, pressure in lines 224 and 225 is delivered to line 164 to operate the vane motor and shift the eccentric 154 ninety degrees for approach to the work.

From the foregoing it will be appreciated that there has been provided individual hand operable servo-control mechanisms for the operation of the rotary motor 144 controlling the ambulatory movement of the cutter and tracer supports and the orientation adjustment of these supports, and additional hand servo-controls for the tilting of the cutter and tracer supports and the vertical movement or depth adjustment of these supports. Additionally, it will be noted that there has been provided an improved selector valve mechanism for determination of the effective coupling of either the hand controls or the several automatic controls for said motors as carried by the body of the tracer support, one of which selector valves is manually positionable to effect simultaneous disengagement of the several potentially available manual machine adjustment controls.

It will further be noted by reference to Figure 17 that in some instances the main pressure line 51a is directly permanently coupled to the various hand servo-controls to insure maximum responsiveness to the adjustment of these controls, while in other instances a reduced constant pressure control circuit is employed, particularly in connection with the ambulatory movement tracer control valve and the direction valves. This reduced constant pressure is supplied through the constant pressure drop valve 235 reacted upon at one end by the main input pressure from conduit 51a opposed by spring 236 and the intermediate pressure existing in conduit 237 directly admissible through ball check 238 but whose return in case of pressure drop is delayed by the action of the resistance coil 239. This valve has the oppositely effective pressure input throttle 240 and exhaust throttle 241.

What is claimed is:

1. A contouring machine including an orientable cutter support and an orientable tracer support, means for effecting corresponding orientation of the cutter support with respect to a workpiece and the tracer support with respect to a pattern, and means for effecting simultaneous corresponding angular adjustments of said supports with respect to the workpiece and pattern.

2. A contouring machine including a base, a cutter support mounted on the base for angular adjustment of its axis in a definite plane, and for rotary orientation about said axis, a tracer support independently mounted on the base for angular adjustment of its axis in a plane parallel to the plane of angular adjustment of the axis of the cutter support, and for rotary orientation about its said axis parallel to the axis of rotary orientation of the cutter support, and means for effecting simultaneous corresponding orientation adjustments of the cutter and tracer supports about their axes.

3. A contouring machine including a base, a cutter support mounted on the base for angular adjustment of its axis in a definite plane, and for rotary orientation about said axis, a tracer support independently mounted on the base for angular adjustment of its axis in a plane parallel to the plane of angular adjustment of the axis of the cutter support, and for rotary orientation about its said axis parallel to the axis of rotary orientation of the cutter support, and means for effecting simultaneous corresponding orientation adjustments of the cutter and tracer supports about their axes, said means including a power circuit, motor means, and a tracer mechanism carried by the tracer support and coupled to the circuit and to the motor means for controlling application of power to the motor means to effect said orientation adjustment.

4. A contouring machine including a base, a cutter support mounted on the base for angular adjustment of its axis in a definite plane, and for rotary orientation about said axis, a tracer support independently mounted on the base for angular adjustment of its axis in a plane parallel to the plane of angular adjustment of the axis of the cutter support, and for rotary orientation about its said axis parallel to the axis of rotary orientation of the cutter support, means for effecting simultaneous corresponding orientation adjustments of the cutter and tracer supports about their axes, said means including a power circuit, motor means, and a tracer mechanism carried by the tracer support and coupled to the circuit and to the motor means for controlling application of power to the motor means to effect said orientation adjustment, movable slides coupled with the supports for effecting their angular adjustment, motor means for actuating the slides, and a second tracer mechanism including a valve carried by the tracer support and coupled to said motor means for controlling movement of the angular adjustment slides.

5. A contouring machine including a base, a cutter support mounted on the base for angular adjustment in a definite plane, and for rotary orientation about an axis lying in said plane, a tracer support independently mounted on the base for angular adjustment in a plane parallel to the plane of adjustment of the cutter support, and for rotary orientation about an axis lying in said latter plane and extending parallel to the axis of rotary orientation of the cutter support, means for effecting simultaneous corresponding orientation adjustment of the cutter and tracer supports, said means including a power circuit, motor means, and a tracer mechanism carried by the tracer support and coupled to the circuit and to the motor means for controlling application of power to the motor means to effect said orientation adjustment, movable slides coupled with the supports for effecting their angular adjustment, motor means for actuating the slides, and a second tracer mechanism including a valve carried by the tracer support and coupled to said motor means for controlling movement of the angular adjustment slides, the tracer support including a deflectible tracer finger, and said second tracer mechanism including a sleeve loosely mounted on the finger for movement with and tilting movement relative to the finger, and fulcrum means pivotally connecting the sleeve to the finger.

6. A contouring machine including a base, a cutter support mounted on the base for angular adjustment in a definite plane, and for rotary orientation about an axis lying in said plane, a tracer support independently mounted on the base for angular adjustment in a plane parallel to the plane of adjustment of the cutter support, and for rotary orientation about an axis lying in said latter plane and extending parallel to the axis of rotary orientation of the cutter support, means for effecting simultaneous corresponding orientation adjustment of the cutter and tracer supports, said means including a power circuit, motor means, and a tracer mechanism carried by the tracer support and coupled to the circuit and to the motor means for controlling application of power to the motor means to effect said orientation adjustment, movable slides coupled with the supports for effecting their angular adjustment, motor means for actuating the slides, and a second tracer mechanism including a valve carried by the tracer support and coupled to said motor means for controlling movement of the angular adjustment slides, the tracer support including a deflectible tracer finger, and said second tracer mechanism including a sleeve loosely mounted on the finger for movement with and tilting movement relative to the finger, and fulcrum means pivotally connecting the sleeve to the finger, said sleeve having an offset flange arcuately movable by tilting of the sleeve relative to the finger, and operating connections between said flange and the valve of said second tracer mechanism.

7. In a contouring machine, a base, a support on the base, a socket supported by the base for rotation relative thereto about a fixed axis, a member pivoted to the socket for rotation therewith and tilting relative thereto, a table mounted on the support for rotation about said axis, a slide mounted on the table for transverse movement as respects said axis, means for effecting synchronous rotation of the socket and table about said axis, and a pivotal connection between the member and slide for effecting tilting movement of the member relative to its supporting socket in accordance with movement of the slide relative to the table in any rotatively adjusted position of the table and socket.

8. In a contouring machine, a base, a support on the base, a socket supported by the base for rotation relative thereto about a fixed axis, a member pivoted to the socket for rotation therewith and tilting relative thereto, a table mounted on the support for rotation about said axis, a slide mounted on the table for transverse movement as respects said axis, means for effecting synchronous rotation of the socket and table about said axis, a pivotal connection between the member and slide for effecting tilting movement of the member relative to its supporting socket in according with movement of the slide relative to the table in any rotatively adjusted position of the table and socket, means intervening the base and support mounting the support for ambulatory movement on the base, a 360 degree tracer mechanism controlling said movement, and connections between said tracer mechanism and the table and socket for synchronizing their rotation with the ambulatory movement of their support.

9. In a contouring machine, a base, a support on the base, a socket supported by the base for rotation relative thereto about a fixed axis, a member pivoted to the socket for rotation therewith and tilting relative thereto, a table mounted on the support for rotation about said axis, a slide mounted on the table for transverse movement as respects said axis, means for effecting synchronous rotation of the socket and table about said axis, a pivotal connection between the member and slide for effecting tilting movement of the member relative to its supporting socket in accordance with movement of the slide relative to the table in any rotatively adjusted position of the table and socket, means intervening the base and support mounting the support for ambulatory movement on the base, a 360 degree tracer mechanism controlling said movement, and connections between said tracer mechanism and the table and socket for synchronizing their rotation with the ambulatory movement of their support, said 360 degree tracer mechanism including a rotary tracer controlled motor, and said connections including gearing actuated by said rotary motor.

10. In a contouring machine, a base, a support on the base, a socket supported by the base for rotation relative thereto about a fixed axis, a member pivoted to the socket for rotation therewith and tilting relative thereto, a table mounted on the support for rotation about said axis, a slide mounted on the table for transverse movement as respects said axis, means for effecting synchronous rotation of the socket and table about said axis, a pivotal connection between the member and slide for effecting tilting movement of the member relative to its supporting socket in accordance with movement of the slide relative to the table in any rotatively adjusted position of the table and socket, means intervening the base and support mounting the support for ambulatory movement on the base, a 360 degree tracer mechanism controlling said movement, connections between said tracer mechanism and the table and socket for synchronizing their rotation with the ambulatory movement of their support, said 360 degree tracer mechanism including a rotary tracer controlled motor, and said connections including gearing actuated by said rotary motor, an auxiliary motor for rotating the table and socket, a servo-valve for regulating the operation of the auxiliary motors, a servo-valve control operable by said rotary motor actuated gearing, and a feed back from the auxiliary motor to said servo-valve control.

11. In a contouring machine, a base, a pair of sockets rotatable on the base about parallel axes, first table mounted on the base for rotation about one of said axes, second table mounted on the base for rotation about the other axis, tracer unit swiveled in one of said sockets, a cutter unit swiveled in the other socket, a tilt control slide carried by each of the tables, operating connections between the slides and units, means for synchronous rotation of the tables and units, means for moving the slides relative to the tables, and means to synchronize the movement of the slides relative to the tables correspondingly to tilt the units relative to the respective slides, said rotating means including a tracer controlled motor, and said means for moving the slides to tilt the units including a second tracer controlled motor, a pattern contactor mounted on the tracer unit for movement relative to the unit, and means operable by movement of the contactor relative to the unit for determining the direction and extent operation of the tracer controlled motors.

12. In a contouring machine, a base, a pair of sockets rotatable on the base about parallel axes, first table mounted on the base for rotation about one of said axes, second table mounted on the base for rotation about the other axis, tracer unit swiveled in one of said sockets, a cutter unit swiveled in the other socket, a tilt control slide carried by each of the tables, operating connections between the slides and units, means for synchronous rotation of the tables and units, means for moving the slides relative to the tables, means to synchronize the movement of the slides relative to the tables correspondingly to tilt the units relative to the respective slides, said rotating means including a tracer controlled motor, and said means for moving the slides to tilt the units including a second tracer controlled motor, a pattern contactor mounted on the tracer unit for movement relative to the unit, means operable by movement of the contactor relative to the unit for determining the direction and extent operation of the tracer controlled motors, and compensator gearing coupled to said motors and to the respective tables and slides, said gearing being operative to maintain the slide positions constant during rotative adjustment of the tables.

13. In a contouring machine, a base, a pair of sockets rotatable on the base about parallel axes, first table mounted on the base for rotation about one of said axes, second table mounted on the base for rotation about the other axis, tracer unit swiveled in one of said sockets, a cutter unit swiveled to the other socket, a tilt control slide carried by each of the tables operating connections between the slides and units, means for synchronous rotation of the tables and units, means for moving the slides relative to the tables, means to synchronize the movement of the slides relative to the tables correspondingly to tilt the units relative to the respective slides, said rotating means including a tracer controlled motor, and said means for moving the slides to tilt the units including a second tracer controlled motor, a pattern contactor mounted on the tracer unit for movement relative to the unit, means operable by movement of the contactor relative to the unit for determining the direction and extent operation of the tracer controlled motors, and compensator gearing coupled to said motors and to the respective tables and slides, said compensator gearing comprising a differential, including a gear on the table, a differential spider having a drive gear, a slide operating shaft coaxial with said gears and a drive connection between the differential and said shaft.

14. In a contouring machine, a base, a pair of sockets rotatable on the base about parallel axes, first table mounted on the base for rotation about one of said axes, second table mounted on the base for rotation about the other axis, tracer unit swiveled in one of said sockets, a cutter unit swiveled to the other socket, a tilt control slide carried by each of the tables, operating connections between the slides and units, means for synchronous rotation of the tables and units, means for moving the slides relative to the tables, means to synchronize the movement of the slides relative to the tables correspondingly to tilt the units relative to the respective slides, said rotating means including a tracer controlled motor, and said means for moving the slides to tilt the units including a second tracer controlled motor, a pattern contactor mounted on the tracer unit for movement relative to the unit, means operable by movement of the contactor relative to the unit for determining the direction and extent operation of the tracer controlled motors, and compensator gearing coupled to said motors and to the respective tables and slides, said compensator gearing comprising a differential, including a gear on the table, a differential spider having a drive gear, a slide operating shaft coaxial with said gears and a drive connection between the differential and said shaft, said connection including drive reversing gearing establishing a common direction of rotation of the table and shaft when the table is rotated substantially as and for the purpose described.

15. A contouring machine comprising a cutter support, a tracer support, a first means for effecting joint ambulatory movements of the supports in a plane for effecting a contouring operation, a second means for effecting joint movement of said supports in a direction toward and from said plane, a third means for effecting joint tilting of the supports relative to said plane, and a tracer mechanism for control of said first, second and third means, said tracer mechanism including a body portion carried by the tracer support, an axially extending rock shaft journaled in the tracer body portion for rocking movement about the axis of the shaft and having a terminal portion projecting from the body portion, a tracer block secured to said projecting portion having a depending sleeve disposed in offset position as respects the axis of rock shaft, a plunger slidably mounted in the block, a first axially extending push rod slidable in the body portion, said plunger subtending the rod for transmitting motion to the rod, the plunger having a contact portion projectable beyond the sleeve, a contactor sleeve loosely circumscribing the depending sleeve for tilting movement relative to the depending sleeve and having an offset flange, a second push rod axially slidable in the body portion and engaging the flange, a pin carried by the depending sleeve and engaging the plunger and circumscribing sleeve for controlling their movements with and with respect to said depending sleeve, an ambulatory movement control valve coupled with the rock shaft for actuation thereby, an independently operable toward and from movement control valve coupled with the first push rod and actuable by movement of the plunger relative to the depending sleeve, and a tilting movement control valve coupled to the second push rod and actuable by tilting movement of the contactor sleeve relative to said depending sleeve.

16. A contouring machine comprising a cutter support, a tracer support, a first means for effecting joint ambulatory movements of the supports in a plane for effecting a contouring operation, a second means for effecting joint movement of said supports in a direction toward and from said plane, a third means for effecting joint tilting of the supports relative to said plane, and a tracer mechanism for control of said first, second and third means, said tracer mechanism including a body portion carried by the tracer support, an axially extending rock shaft journaled in the tracer body portion for rocking movement about the axis of the shaft and having a terminal portion projecting from the body portion, a tracer block secured to said projecting portion having a depending sleeve disposed in offset position as respects the axis of rock shaft, a plunger slidably mounted in the block, a first axially extending push rod slidable in the body portion, said plunger subtending the rod for transmitting motion to the rod, the plunger having a contact portion projectable beyond the sleeve, a contactor sleeve loosely circumscribing the depending sleeve for tilting movement relative to the depending sleeve and having an offset flange, a second push rod axially slidable in the body portion and engaging the flange, a pin carried by the depending sleeve and engaging the plunger and circumscribing sleeve for controlling their movements with and with respect to said depending sleeve, an ambulatory movement control valve coupled with the rock shaft for actuation thereby, an independently operable toward and from movement control valve coupled with the first push rod and actuable by movement of the plunger relative to the depending sleeve, a tilting movement control valve coupled to the second push rod and actuable by tilting movement of the contactor sleeve relative to said depending sleeve, a rotary motor coupled to the ambulatory movement control valve, and means coupled with and actuable by said motor for effecting rotary orientation movements of the cutter and tracer supports.

References Cited in the file of this patent
UNITED STATES PATENTS

| | | |
|---|---|---|
| 2,424,031 | Heer | July 15, 1947 |
| 2,675,743 | Martellotti et al. | Apr. 20, 1954 |